Nov. 30, 1937.    V. W. KLIESRATH    2,100,561
VEHICLE
Filed April 4, 1934    5 Sheets-Sheet 5

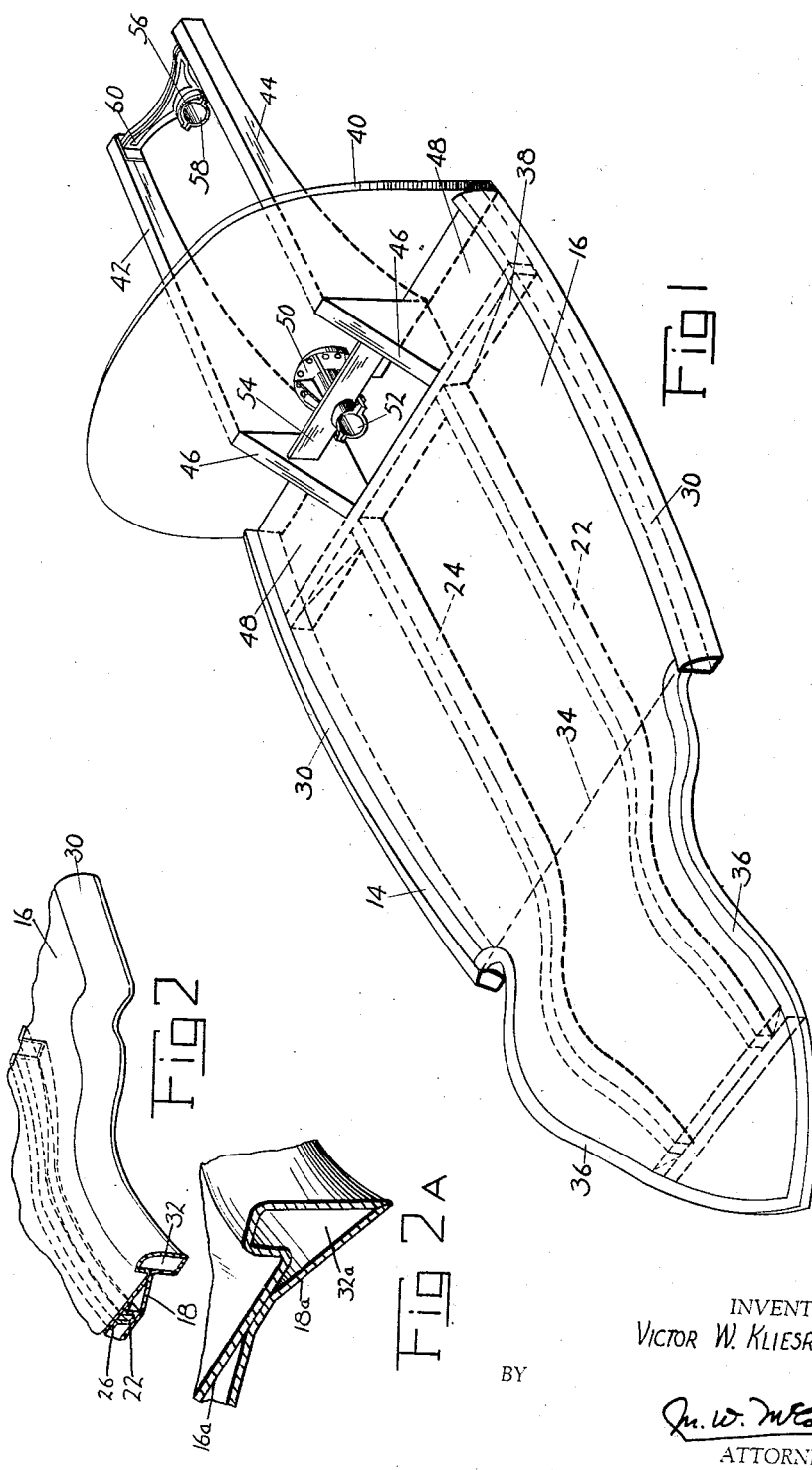

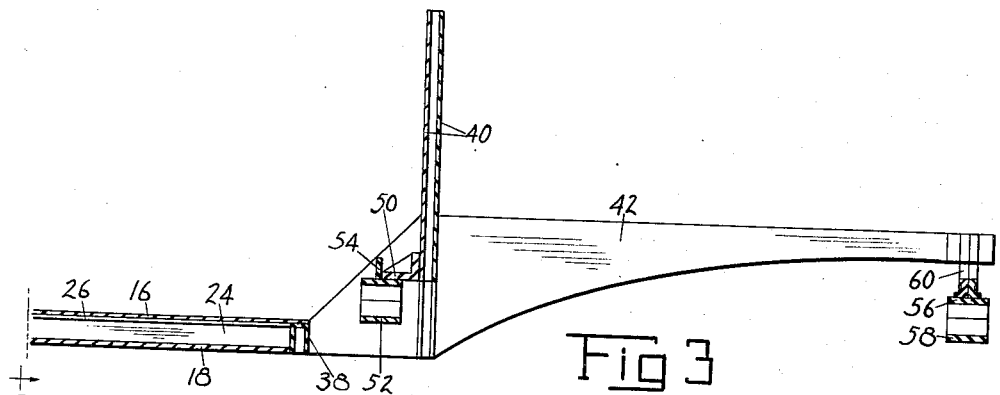
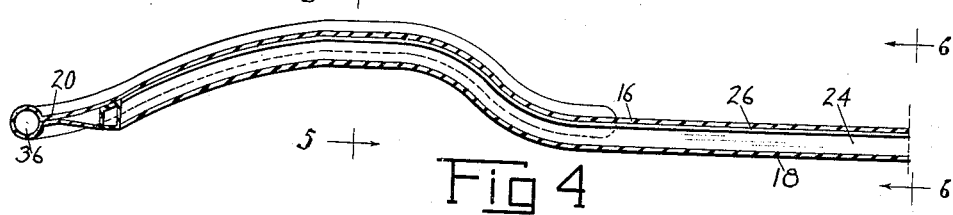
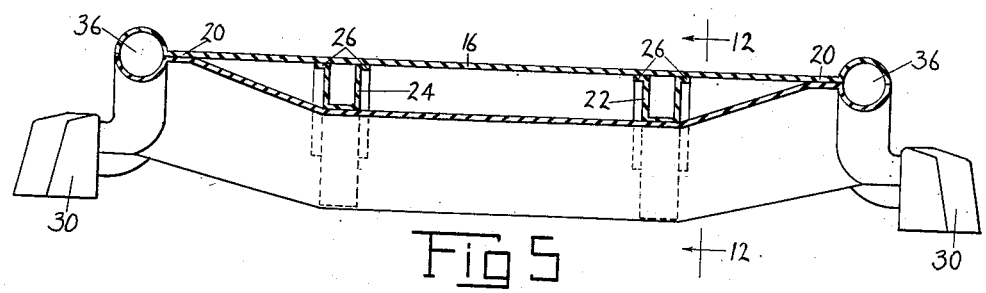
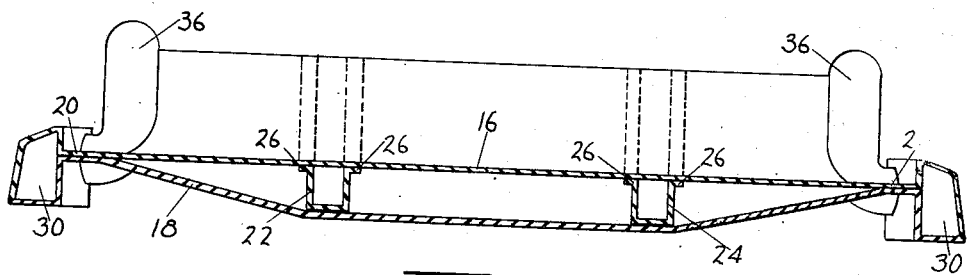

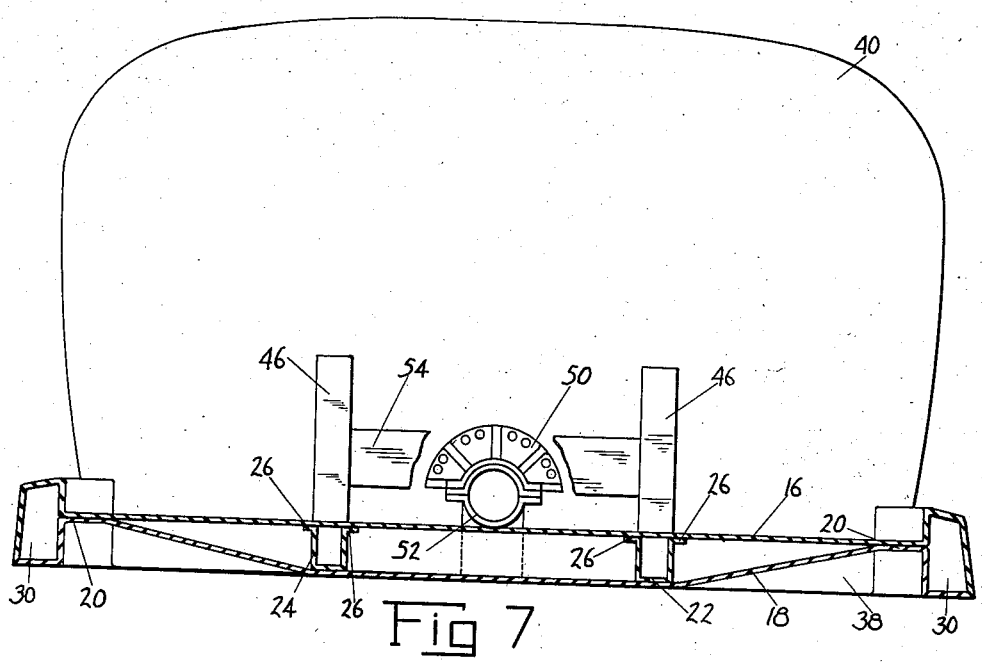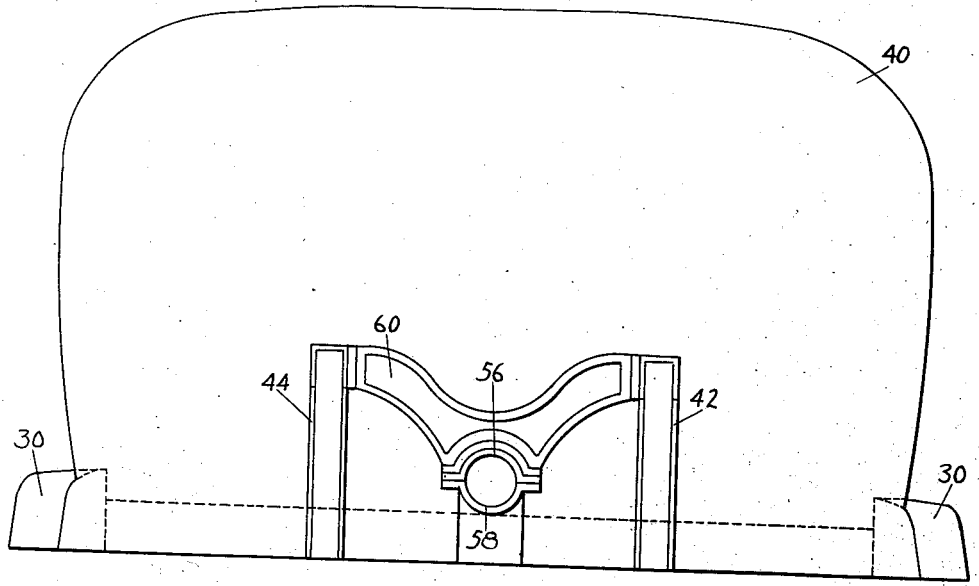

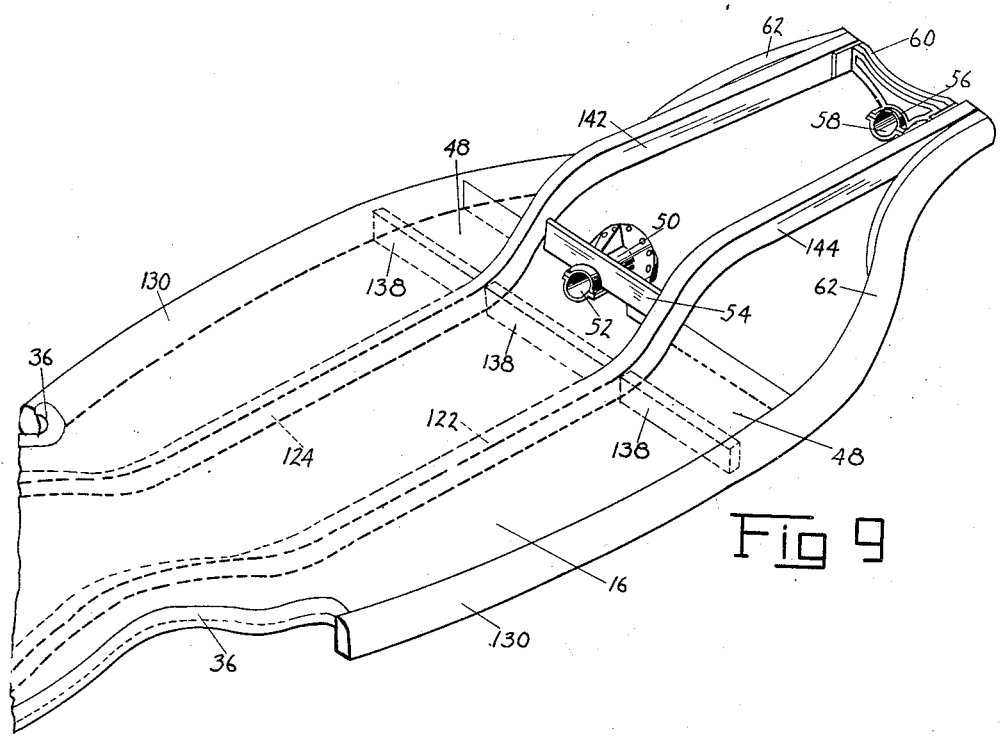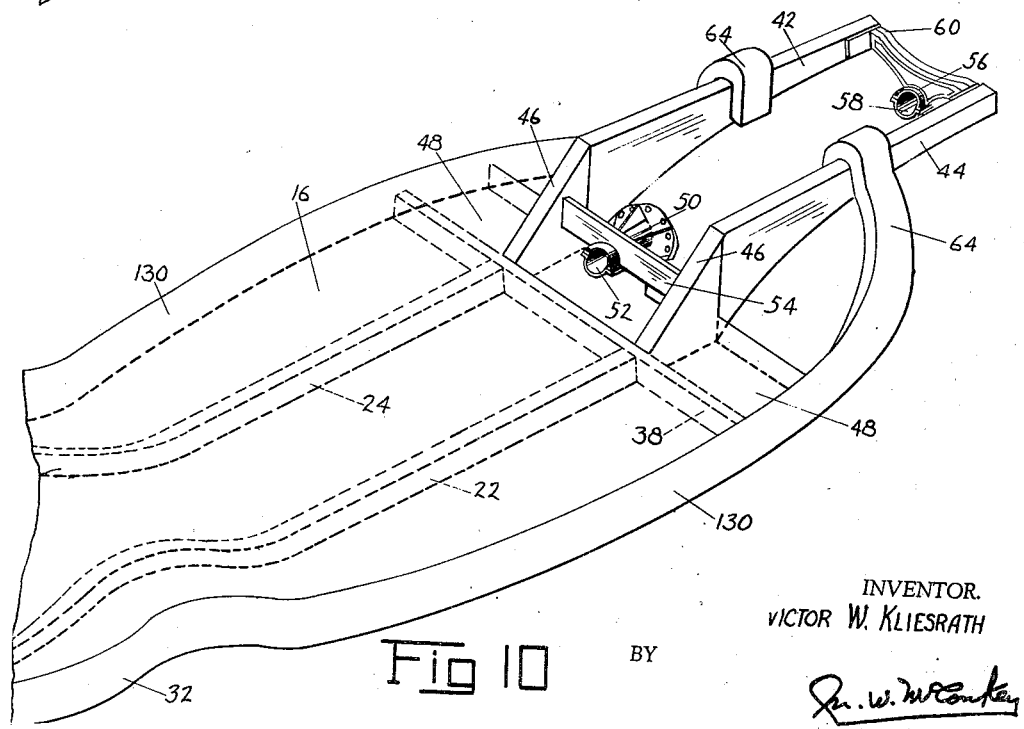

INVENTOR.
VICTOR W. KLIESRATH
BY
ATTORNEY.

Patented Nov. 30, 1937

2,100,561

UNITED STATES PATENT OFFICE 2,100,561

VEHICLE

Victor W. Kliesrath, South Bend, Ind., assignor to The Steel Wheel Corporation, Chicago, Ill., a corporation of New York Application April 4, 1934, Serial No. 718,929

16 Claims. (Cl. 280—106)

This invention relates to automobiles and similar vehicles, and is illustrated as embodied in a novel chassis base adapted to serve as the vehicle frame and at the same time form the floor section of the vehicle body.

An object of the invention is to provide a simple base or frame which is adequately stiffened and reinforced, and which can readily be manufactured on a large scale by well-known manufacturing methods and at a low cost. A further and important object is to provide such a base or frame with inexpensive but very strong means for movably mounting a power plant, preferably at the front end of the vehicle.

In the illustrated embodiment, the base or frame has what may be called a floor section formed with a floor board and a bottom plate and having, preferably welded in place between the floor board and bottom plate, spaced parallel channel or other shaped longitudinal structural reinforcing elements. I prefer to press or otherwise provide or form the floor board and the bottom plate, along their side edges, with reinforcing means such as registering channels which are welded or otherwise secured together face to face to form tubular or box-section side frame members.

This floor section is shown reinforced transversely across the front, the reinforced front portion ordinarily carrying the vehicle dash.

Where the power plant is to be mounted as described, I provide the floor section with spaced forwardly-projecting arms, adapted to have the power plant arranged between them, and which carry a front support for the power plant. This support is preferably a bearing alined with a similar rear bearing carried by the floor section approximately at the dash.

These arms are in effect continuations of the above-described longitudinal structural elements. They may be separate stampings welded or otherwise secured to the transverse reinforced front portion of the floor section, behind the dash, substantially in alinement with the structural elements, or they may form actual integral extensions of those elements.

I prefer to mount this base or frame on the road wheels by means of independent spring-suspension devices, of which the two front sets are preferably secured to the pivotally-mounted power plant, while the two rear sets may advantageously be yieldingly secured to brackets bolted or otherwise mounted on the longitudinal structural elements near their rear ends.

The above and other objects and features of the invention, including various novel combinations of parts and desirable particular constructions, will be apparent from the following description of the illustrative embodiments shown in the accompanying drawings, in which:

Figure 1 is a perspective view of one form of base or frame embodying the invention;

Figure 2 is a fragmentary perspective showing a modification of Figure 1;

Figure 2a is a similar view showing another modification;

Figure 3 is a longitudinal vertical section through the front half of the base or frame shown in Figure 1;

Figure 4 is a similar section through the rear half;

Figure 5 is a transverse vertical section therethrough, on the line 5—5 of Figure 4;

Figure 6 is a transverse vertical section on the line 6—6 of Figure 4;

Figure 7 is a transverse vertical section on the line 7—7 of Figure 3;

Figure 8 is a front elevation of the base or frame of Figure 1;

Figures 9 and 10 are perspective views of two further modifications;

Figure 11:
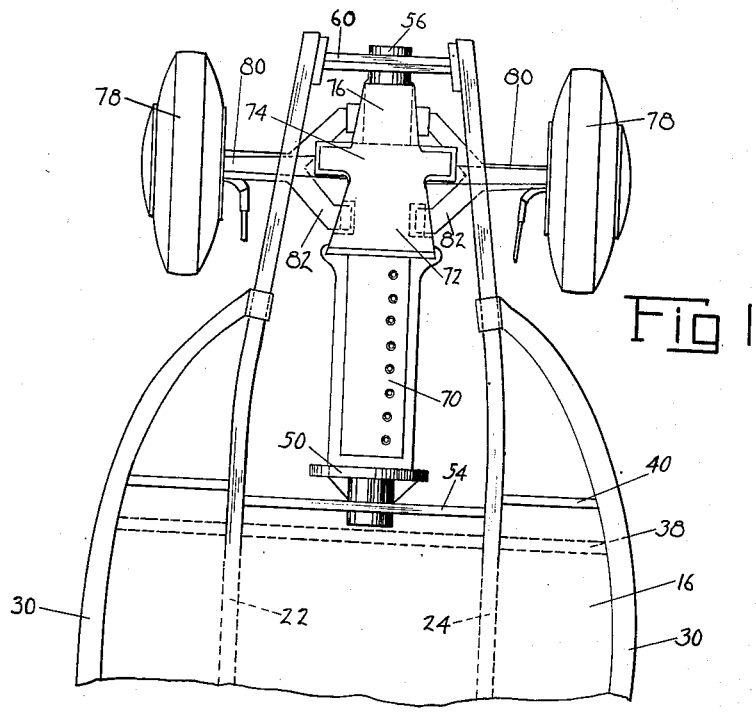
Figure 11 is a top plan view showing the mounting of the power plant with the front independent spring suspension devices, and showing for convenience the base or frame of Figure 10.

The novel base or frame shown in Figures 1 and 3-8 comprises a floor section, indicated in Figure 1 generally at 14, and which is shown as comprising a floor board 16 and a bottom plate 18, both steel stampings, seam or spot welded or otherwise secured together along their side edges at 20 (Figures 6 and 7). Between these seam-welds or other fastenings or joints 20, the stampings 16 and 18 are spaced apart by spaced longitudinally extending parallel channel or other shape structural elements 22 and 24 seam or spot welded or otherwise secured on their bottom faces to the bottom plate 18 and shown with top flanges 26 similarly secured to the lower face of the floor board 16.

In order to reinforce the sides of the base or frame 14, the edge portions of the stampings 16 and 18, outside the seams or joints 20, may be formed with registering channels or the like pressed or formed therein, or secured thereto, and which are preferably welded together face to face by butt-welding the outer walls of the channels together, thus forming tubular or box-section reinforcements 30 extending along the opposite side edges.

Figure 2a shows an arrangement in which a side reinforcement 32a is formed partly by a channel pressed in the edge of the plate 16a, the bottom plate having an inclined truss or brace portion welded to the edge of the channel.

While, as shown in Figure 2, these side reinforcements may be extended at 32 entirely to the rear end of the frame, such heavy reinforcements are really not needed behind the rear seat. It will be appreciated that the stampings 16 and 18 are so large that they will usually be made in sections welded or otherwise secured together. I take advantage of this in the modification of Figure 1 to have the rearmost sections terminate at a line 34 just behind the rear seat, and to form these rearmost sections with a lighter or smaller tubular or box-section edge reinforcement 36 which may be made in the same manner as the heavier reinforcements 30. The front ends of the reinforcements 36 are preferably welded to the rear ends of the reinforcements 30.

These rear sections, and their reinforcements 22, 24, and 36, may be offset upwardly opposite the rear wheels, to clear the axle or spring suspension devices described below.

In the embodiment of Figure 1, the floor board 16 and the structural elements 22 and 24 terminate at their forward ends at a transverse strengthening and reinforcing member 38, shown as a channel-shaped structural element to which these parts are welded, and which is secured by welding or otherwise at its ends to the side reinforcements 30. In front and paralleling the member 38 is another transverse reinforcing member, which I prefer to extend upwardly to form a dash 40. The dash 40 is shown welded to the ends of the side reinforcements.

Alined with the structural elements 22 and 24, and forming continuations thereof, there are shown two spaced stamped-steel box-section arms 42 and 44, having inclined portions 46 which support the usual inclined toe-board (not shown), and the rear ends abut against and may be welded to the cross member 38. The dash 40 may be notched out to fit over these arms.

The floorboard 16 and bottom plate 18 are shown with side wings 48 extending across the cross member 38 on opposite sides of the inclined parts 46 to abut against (and if desired be welded to) the rear face of the dash 40.

The space between the inclined portions 46 is however left clear, to afford room for a rear power plant support such as a bearing 50, preferably having a detachable lower cap 52. This bearing is shown bolted to the rear face of the dash 40, and may have welded thereto a cross brace 54 adapted to be secured at its ends to the inclined portions 46 of the two arms 42 and 44.

Another engine or power plant support, for the front end of the power plant, may take the form of a similar bearing 56 alined with the rear bearing 50 described above, and having a similar detachable bottom cap 58, and which is shown as an integral part of a cross member 60 welded or otherwise secured at its ends to the front ends of the arms 42 and 44.

As shown in Figure 9, if desired the structural elements 122 and 124 may be extended integrally forward beyond the dash to form arms 142 and 144 corresponding to arms 42 and 44 described above. Also, if necessary to secure sufficient strength and rigidity, the side reinforcements 130 may have forward extensions 62 integral therewith or welded rigidly thereto, and which are welded or otherwise secured at their front ends to the front ends of the arms 142 and 144.

Figure 10 shows how the separate arms 42 and 44 may be similarly braced, but in this figure the extensions 64 of the side reinforcements 130 are shown secured to the arms 42 and 44 between their ends.

Where elements 122 and 124 are integral with arms 142 and 144, as in Figure 9, the cross member 38 is replaced by three alined cross sections 138 welded in place.

Figure 11 shows how the power plant may be mounted in the above-described construction. The illustrated power plant includes an engine 70, a clutch 72, a differential 74, and a transmission 76, all secured together as one rigid unit and arranged to drive the swiveled front road wheels 10 78 through suitable universally-jointed driving axle shafts.

The opposite sides of this power plant unit have yieldingly mounted thereon sets of independent spring suspension devices rotatably carrying the wheels 78. In the arrangement illustrated, each set includes an upper straight axle section 80 and a lower Y-shaped section 82 having diverging arms the ends of which, as also the end of the straight section 80, are seated in rubber blocks mounted in sockets formed in the sides of the power plant housing.

Figure 12:
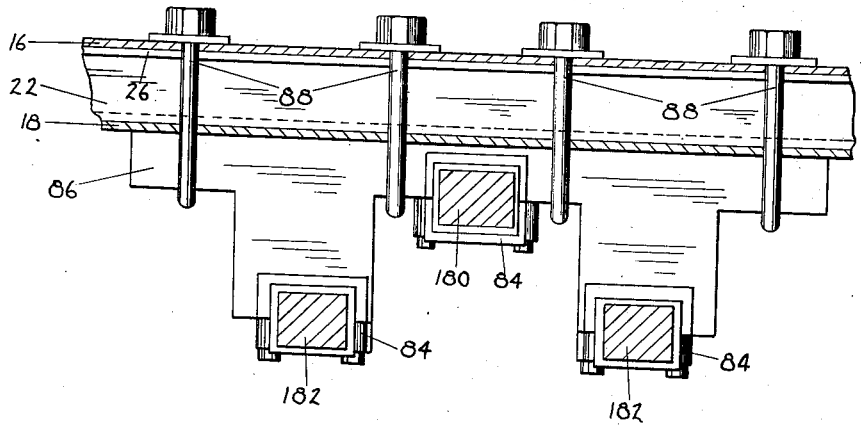
Figure 12 is a partial longitudinal section on the line 12—12 of Figure 5, but having added thereto the means for mounting the rear independent spring suspension devices.

Figure 12 shows one way of mounting the same spring suspension devices at the rear, for the rear road wheels. In this case the ends of the two arms of the lower axle section 182, and the end of the upper section 180, are mounted the same as in the case of sections 80 and 82 at the front, detachable caps 84 holding them gripped between blocks of rubber held in sockets. In the case of the rear suspension, however, the sockets are formed in a bracket 86 secured rigidly by U-bolts 88, or other means, to the corresponding structural element 22 or 24.

The above-described power plant mounting, and the described arrangement of the rear spring suspension, are generally the same as described and claimed in my prior application No. 651,821, filed January 14, 1933. It is not my intention to claim in the present application any of the subject-matter of said prior application.

While several illustrative embodiments have been described in detail, it is not my intention to limit the scope of the invention to those particular embodiments, or otherwise than by the terms of the appended claims.

I claim:

1. An automobile chassis base or frame comprising a floor board, longitudinally-extending-structural members secured to the bottom face of the floor board, a bottom plate secured to the lower surfaces of said members and secured at their side edges to the side edges of the floor board, said bottom plate and said floor board being provided with reinforcing and strengthening means extending along the sides of the frame, a rear power-plant support mounted on the frame adjacent the front end of the floor board, and continuations of said structural members extending forwardly beyond the front end of the floor board and spaced apart to permit a power plant to be arranged between them and having a front power-plant support alined with said rear support.

2. An automobile chassis base or frame comprising a floor board, longitudinally-extending-structural members secured to the bottom face of the floor board, a bottom plate secured to the lower surfaces of said members and secured at their side edges to the side edges of the floor board, said bottom plate and said floor board being provided with reinforcing and strengthening means extending along the sides of the frame, a rear power-plant support mounted on the frame adjacent the front end of the floor board, and continuations of said structural members extending forwardly beyond the front end of the floor board and spaced apart to permit a power plant to be arranged between them and having a front power-plant support alined with said rear support, said reinforcing means being extended forwardly and engaging and secured to and bracing said continuations.

3. An automobile chassis base or frame comprising a floor section having secured thereto and forming a reinforcement thereof a pair of spaced longitudinal generally-parallel structural elements spaced inwardly a substantial distance from the side edges of said section and a bottom plate secured to said elements and to the edges of said floor section, and having parts alined with and forming continuations of said elements and projecting forwardly of said floor section as spaced arms adapted to have a power plant arranged between them, said elements and parts being substantially the same horizontal distance apart from the front to their rear ends, and power plant supports of which one at the front end of the chassis is carried by said arms.

4. An automobile chassis base or frame comprising a floor section having secured thereto and forming a reinforcement thereof a pair of spaced longitudinal generally-parallel structural elements spaced inwardly a substantial distance from the side edges of said section and lying in substantially the same horizontal plane as said section, and having parts alined with and forming continuations of said elements and projecting forwardly of said floor section as spaced arms adapted to have a power-plant arranged between them, and power plant supports of which one at the front end of the chassis is carried by said arms, said floor section having along its opposite sides reinforcing means extending forwardly and engaging and bracing said arms.

5. An automobile chassis base or frame comprising a floor section built up of a floor board and a bottom plate having longitudinally-extending structural reinforcing elements secured between them and having their edges secured together and formed with channel-section edge portions secured together face to face to form tubular reinforcements along said edges.

6. An automobile chassis base or frame comprising a floor section built up of a floor board and a bottom plate having longitudinally-extending structural reinforcing elements secured between them and having their edges secured together and provided with tubular reinforcements along said edges.

7. An automobile chassis base or frame comprising a floor section built up of a floor board and a bottom plate having longitudinally-extending structural reinforcing elements secured between them and having their edges secured together and provided with tubular reinforcements along said edges, said elements and said reinforcements having extensions forming spaced braced arms at the front end of said frame.

8. An automobile chassis base or frame comprising a floor section built up of a floor board and a bottom plate having longitudinally-extending structural reinforcing elements secured between them and having their edges secured together and provided with tubular reinforcements along said edges, said elements having extensions forming spaced braced arms at the front end of said frame.

9. An automobile chassis base or frame comprising a floor section built up of a floor board and a bottom plate having longitudinally-extending structural reinforcing elements secured between them and having their edges secured together and provided with tubular reinforcements along said edges, said elements having extensions integral therewith and forming spaced braced arms at the front end of said frame.

10. A chassis base comprising a floor board and a bottom plate formed at the sides of the base with registering channel-section reinforcements secured together face to face to form tubular reinforced edges for said base, said floor board bridging across the space between said edges in a plane substantially below the tops of said reinforcements.

11. A chassis base comprising a floor board and a bottom plate formed at the sides of the base with registering channel-section reinforcements secured together face to face to form tubular reinforced edges for said base, and having between said edges other reinforcements generally paralleling said side reinforcements.

12. A chassis base comprising a floor board and a bottom plate formed at the sides of the base with registering channel-section reinforcements secured together face to face to form tubular reinforced edges for said base, and having a reinforced transverse portion across its front and provided with spaced arms secured to and projecting forwardly from said portion and adapted to have a power plant mounted between them.

13. A base structure for an automobile chassis comprising a floor board and a bottom plate secured together with longitudinal reinforcements between them, and having at its edges longitudinal reinforcements extending from approximately the plane of the bottom plate to a plane considerably above the plane of the floor board.

14. A base structure for an automobile chassis comprising a floor board and a bottom plate secured together with reinforcements between them, and having at its edges longitudinal reinforcements extending to a plane considerably above the plane of the floor board.

15. A base for an automobile chassis comprising a floor-board having edge reinforcements extending above the plane thereof, and having spaced inwardly from said edges longitudinal reinforcements secured to its lower face and having at their front ends extensions deflected upwardly to a plane considerably above the plane of the floor board and then continued forwardly as spaced supporting arms the edge reinforcements being secured to said arms to strengthen and brace them.

16. A vehicle chassis comprising a floor board, longitudinal reinforcement secured to the opposite edges of the floor board and lying substantially in the plane thereof, a pair of substantially parallel longitudinal reinforcements secured to said floorboard and spaced inwardly from said edges and extending substantially throughout the length of the chassis, said last named reinforcements being offset upwardly at their forward ends and extending beyond said floorboard to provide a pair of spaced arms adapted to receive an engine between them, a cross member secured to said arms and forming a front engine support, and a second cross member on said chassis forming a rear engine suport.

VICTOR W. KLIESRATH.